Nov. 23, 1965　　　J. S. HICKMAN　　　3,219,810
LIGHT TRANSMITTING AND HEAT TRANSFERRING APPARATUS
Filed Aug. 10, 1961　　　　　　　　　　　　4 Sheets-Sheet 1
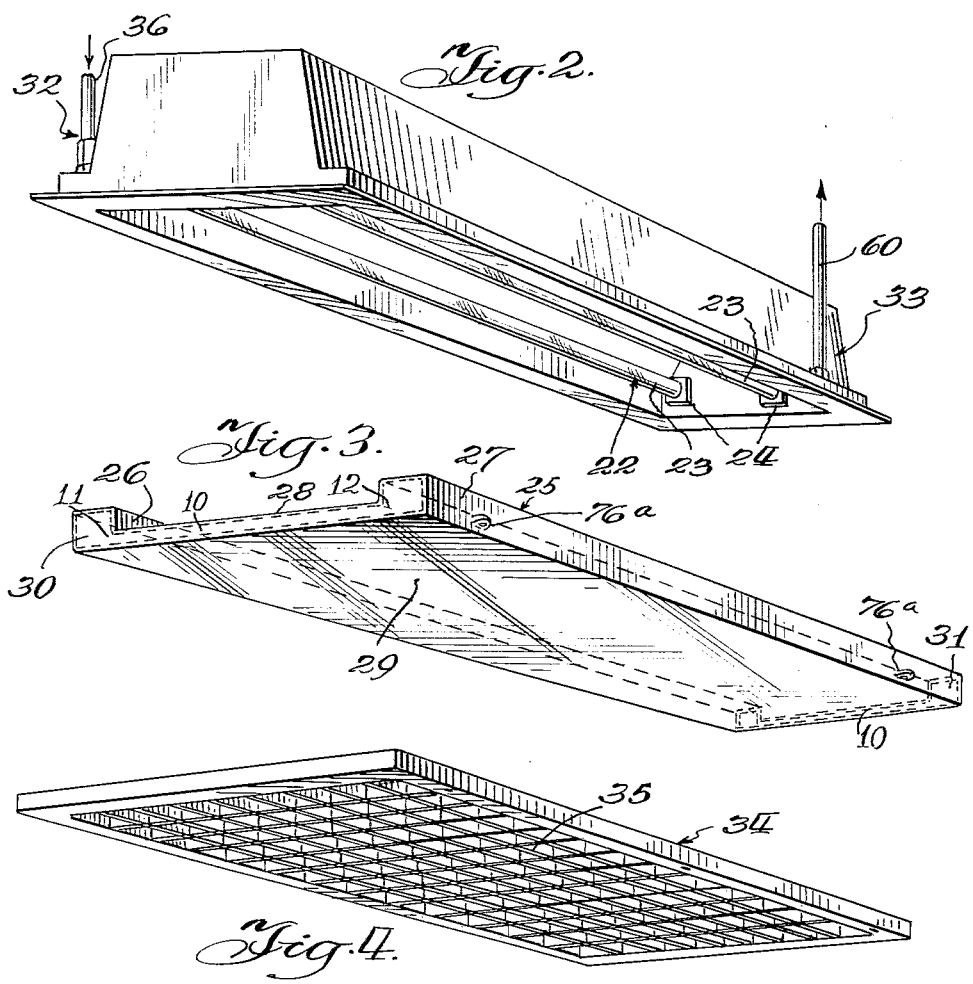
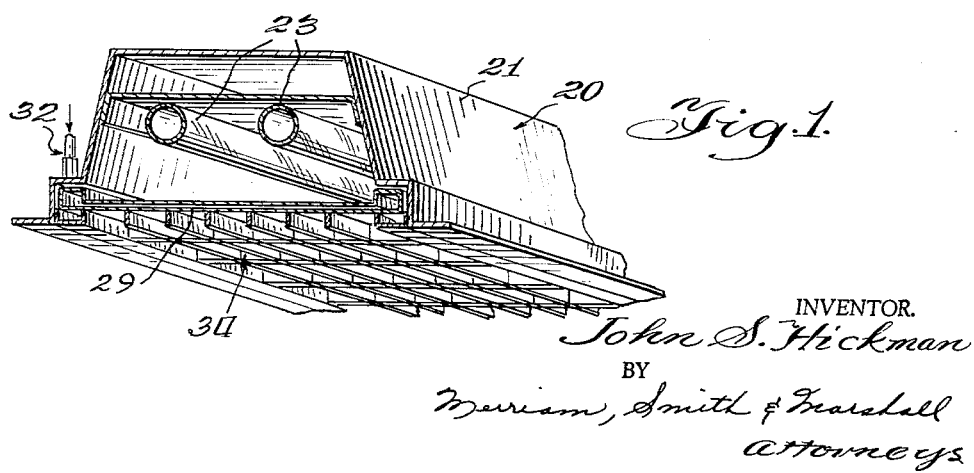
INVENTOR.
John S. Hickman
BY
Merriam, Smith & Marshall
Attorneys

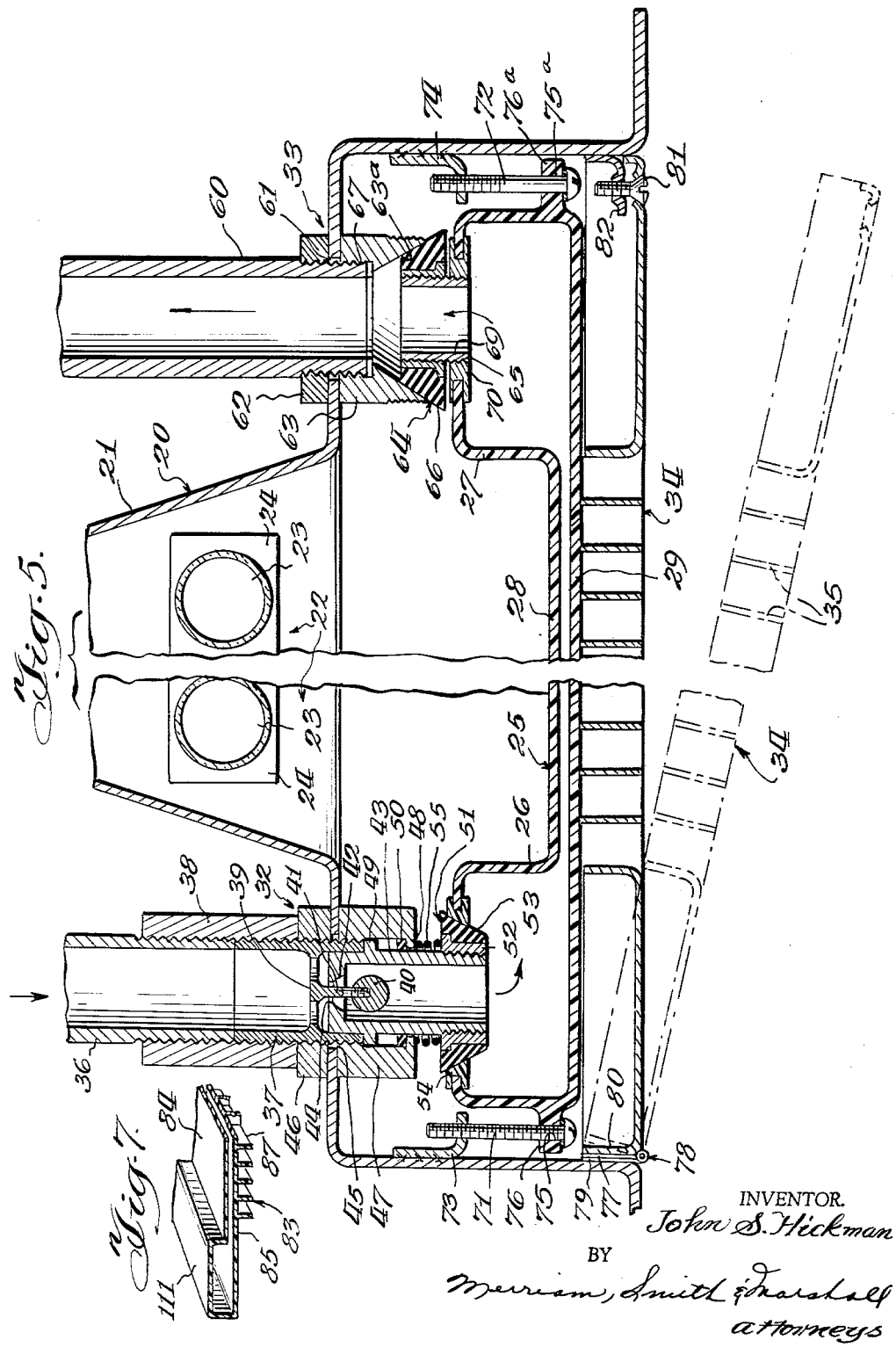

INVENTOR.
John S. Hickman
BY
Morrison, Smith & Marshall
Attorneys

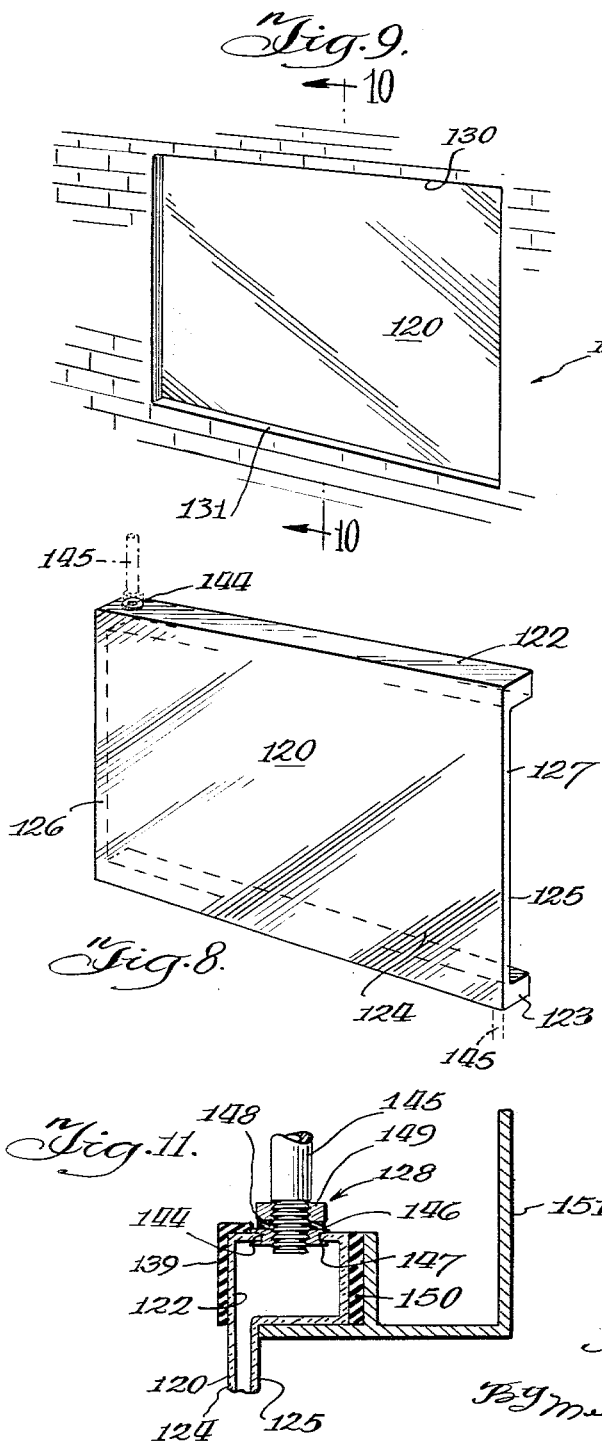

United States Patent Office 3,219,810
Patented Nov. 23, 1965

3,219,810
LIGHT TRANSMITTING AND HEAT
TRANSFERRING APPARATUS
John S. Hickman, Shorewood, Wis., assignor to Inland
Steel Products Company, Milwaukee, Wis., a corporation of Delaware
Filed Aug. 10, 1961, Ser. No. 130,692
2 Claims. (Cl. 240—9)

The present invention relates to a light transmitting and heat transferring apparatus and more particularly the invention relates to apparatus through which light energy is transmittable into an enclosure and through which an energy transfer medium is conducted for absorbing heat energy.

A considerable amount of heat energy is radiated by the lights located in the ceilings of enclosed spaces of a building and, in addition, a considerable amount of solar heat energy is radiated through windows in the walls of the building. This radiant energy, if not removed, is the source of discomfort to the occupants of the enclosed spaces. Where the level of illumination is high and where high intensity lights are therefore provided, the air conditioning equipment must be sized large enough to remove the radiant heat energy emitted by electric lights. Similarly, in modern buildings where the windows comprise a large portion of the walls thereof, the solar radiant heat energy is required to be removed if comfort conditions are to prevail. Accordingly, to obviate the need for a good deal of the air conditioning equipment referred to, the invention provides means for removing this radiant heat energy before it becomes a problem.

In one of the embodiments of the invention, a light transmitting and heat transfer panel is mounted in an opening in a wall of the enclosure. The panel is disposed in the path of the natural light and heat energy emitted by the sun. The light is transmitted through the panel, which is composed of a transparent or translucent material, but the heat energy is removed by the heat transfer medium which, in one application, is a cooling medium. If desired, the energy transfer medium is a heating medium, in which case the enclosure can be heated. It is apparent that the same apparatus is adapted to function either as a heating or cooling panel, in addition to transmitting light.

Another embodiment of the invention functions to transmit light into the enclosure and to trap and remove the heat emitted by electrical lighting means before the heat can be transmitted into the enclosure. The heat energy transfer panels of the invention extend across the entire area through which the light emitted by lighting means is transmitted into the enclosure, and since the path of the light is also the path of the heat energy, the heat energy is removed upon passing into the panel, which is cooled by a cooling medium. Alternatively, to provide heating a heating medium is passed through the panel.

One of the features of the invention is that the apparatus can take the form of individual units which provide both lighting and cooling or heating of the enclosure. It is apparent, therefore, that several of the apparatus can be selectively and conveniently positioned around the periphery of the enclosure to afford the desired lighting and cooling. If desired, however, the panel can be constructed to extend across the entire ceiling to provide a luminous ceiling The capacity of the apparatus of the invention is such that not only is the radiant heat energy of the sun in one embodiment and the heat emitted by the lighting means in the other embodiments removed, but heat energy is also absorbed from the enclosed space. Hence, it is apparent that the panel functions also as a radiant cooling panel.

Since the heat energy which passes into the panel is removed even by passing relatively high temperature water between spaced panes of the panel, cooling medium supplied from a relatively high temperature source such as a cooling tower, a lake, or the like is adequate. The water from these sources is less costly than water cooled by refrigeration. However, relatively low temperature water, such as that produced by refrigeration, causes greater cooling of the enclosed space.

Another feature of the invention is that the energy transfer panel is removably secured to inlet and outlet means for the cooling medium, which is circulated therethrough. In one of the embodiments of the invention the flow of the cooling medium is automatically arrested when the cooling means is detached from the inlet means.

In each of the embodiments of the invention, the heat energy transfer panel has two panes, disposed in vis-a-vis relationship defining a channel therebetween, between which a heat transfer medium is adapted to pass. The panes cover the entire light transmitting area and therefore the heat energy transfer medium is disposed in the path of the entire area through which the heat from the lighting means would be transmitted into the enclosure.

The panel of the invention consists of spaced panes between which a continuous film of heat transfer medium is passed. Preferably the panes are so spaced and the flow is of a sufficiently low rate that a streamline flow exists as the heat transfer medium is passed in one direction between the panes. Streamline flow makes the heat transfer medium invisible to the human eye. Where a random pattern effect is desired, for example, to render the transparent panel translucent, or for aesthetic effects, the rate of flow is increased or the spacing of the panes is reduced, to create turbulent flow. Streamline flow and turbulent flow are terms of art and are defined, for example, in Chemical Engineers' Handbook, third edition, published by McGraw-Hill Book Publishing Company, Inc., 1950, edited by John H. Perry, at page 375.

In the diagrammatic drawings:

FIGURE 1 is a fragmentary perspective view of one embodiment of the lighting and cooling apparatus of the invention, showing the lighting means and the cooling panel;

FIGURE 2 is a perspective view of the inverted trough-shaped support member which houses the lighting means and the cooling panel;

FIGURE 3 is a perspective view of one embodiment of the cooling panel employed in the invention;

FIGURE 4 is a perspective view of a louvered light diffusing and heat conducting member;

FIGURE 5 is a cross-sectional view, partly broken away, showing in particular inlet means in a position wherein the cooling medium can pass into the cooling panel and outlet means through which the warmed cooling medium leaves the cooling panel;

FIGURE 7 is a fragmentary perspective view of another embodiment of the cooling panel of FIGURE 3, wherein a plurality of louver elements are formed integral with one of the panes to diffuse the light and assist in cooling the enclosure;

FIGURE 8 is a perspective view of another embodiment of the invention, wherein the panel serves as a window through which solar light energy passes;

FIGURE 9 is a perspective view of the panel of FIGURE 8 shown mounted in an opening in the wall of a building;

FIGURE 10 is a cross-sectional view taken along line 10—10 of FIGURE 9, showing the manner in which the panel of FIGURE 8 is mounted and connected to the inlet and outlet means in the wall; and FIGURE 11 is a cross-sectional, fragmentary view showing the manner of attachment of the inlet means to the supply header of the panel of FIGURE 10.

Figure 6:
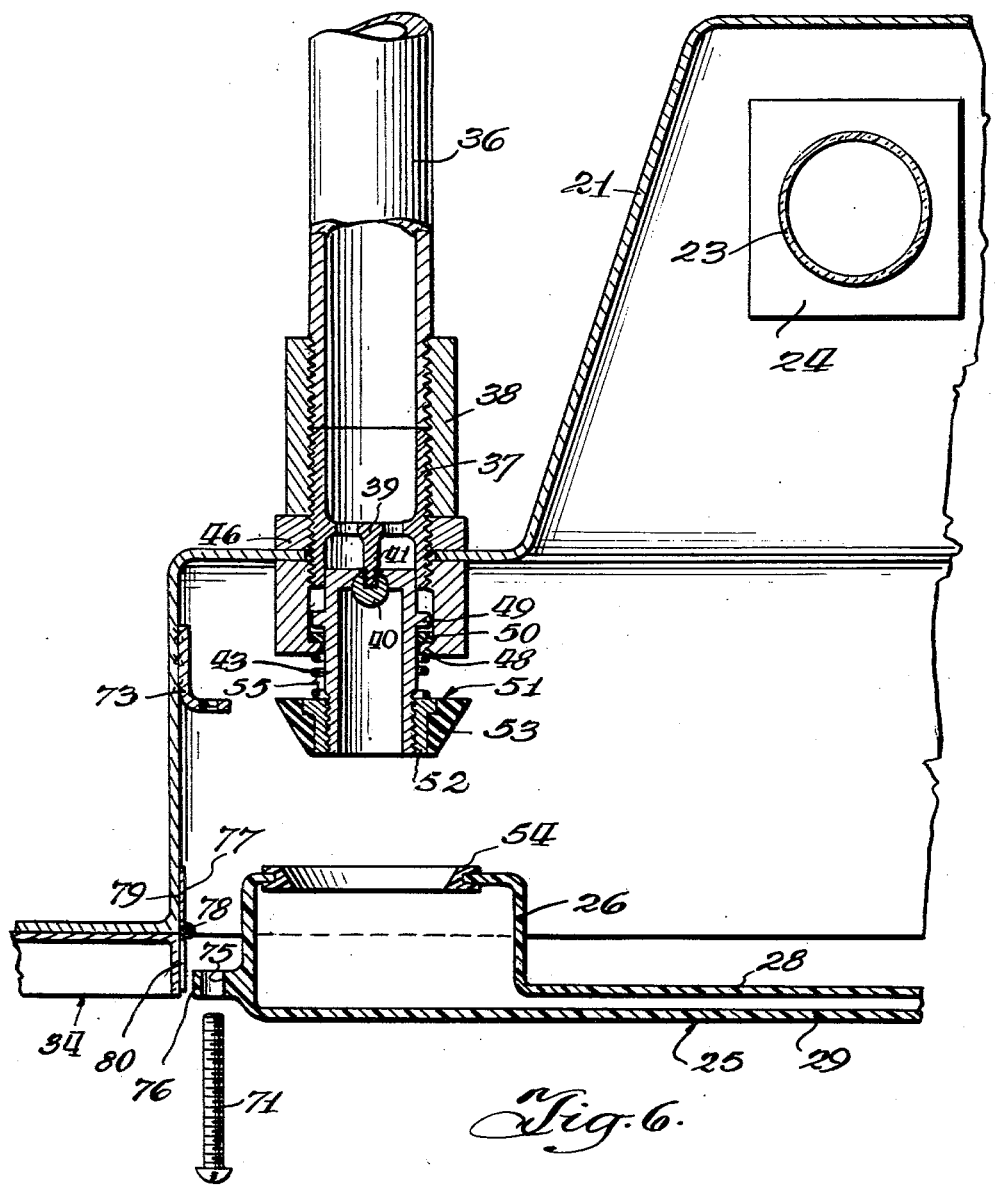
FIGURE 6 is a cross-sectional fragmentary view of the apparatus showing the inlet means in a position wherein no cooling medium can pass therethrough.

Referring now to the illustrative drawings, there is shown in FIGURE 1 an apparatus 20 for lighting and cooling an enclosure. The apparatus 20 includes an inverted trough-shaped support member 21, which is employed to support the other components of the apparatus. Lighting means 22 ordinarily and preferably take the form of fluorescent lamps 23 and ballasts (not shown). The lamps 23 are mounted in suitable conventional electrical receptacles 24 to which ballast leads (not shown) are connected.

The heat which is emitted by the lighting means 22 is absorbed by a cooling panel generally indicated at 25. The cooling panel 25 includes a supply header 26 and a return header 27, and a pair of panes 28 and 29 which are disposed in vis-a-vis relationship with respect to each other into which the supply header 26 and the return header 27 open. The sides 10 of the cooling panel 25 are closed, as indicated at 30 and 31. The panes 28 and 29 are spaced so that a streamline flow of the cooling medium from the supply header 26 to the return header 27 results. The cooling medium therefore does not cause flickering or shadows to be cast into the enclosed space under conditions of streamline flow. The cooling medium enters the supply header 26 of the cooling panel 25 through inlet means generally indicated at 32, while the warmed cooling medium leaves the return header 27 and passes into outlet means generally indicated at 33.

A light diffusing member 34 is disposed immediately below panel 25. The light diffusing member 34 diffuses the light emitted by the lighting means 22. It also absorbs heat energy from the air which comes into contact therewith. The light diffusing member 34 has a plurality of louver elements 35 which form a louvered construction and which perform the light diffusing and cooling functions. The louver elements 35 are preferably made of a metal such as aluminum or steel, which are good conductors of heat energy, but they can also be constructed of transparent or translucent glass or plastic.

Referring now to FIGURE 5 of the drawings, various details of construction are shown. A cooling medium supply conduit 36 which conducts a cooling medium from a suitable source, for example, a closed circuit cooling tower heat exchanger, leads into the inlet means 32. The conduit 36 is aligned with and communicates with a valve member 37. The valve member 37 is threaded on its outer periphery and the conduit 36 and the valve member 37 are threadably connected by a threaded union 38. The interior of the valve member 37 has a perforate web 39 which extends transversely thereof. A ball 40, threadably attached to a stem 41 which depends from the web 39, cooperates with a valve seat 42 and functions to close off the flow of the cooling medium when the cooling panel is disconnected from the inlet means 32. The valve seat 42 is made to correspond to the shape of the ball 40 which is adapted to seat thereagainst. A seat member 43 which contains the seat 42 is adapted to move longitudinally within the valve member 37 with respect to the ball 40. The cooling medium passes into the seat member 43 through an aperture 44 through which the stem 41 of the valve member 37 extends. The support member 21 has an aperture 45 therein through which the valve member 37 is adapted to protrude. A coupling nut 46 is threaded onto the valve member 37 and abuts the support member 21 on the one side thereof, while a coupling nut 47 is threaded onto the end of the valve member 37 on the other side thereof. The coupling nut 47 has a circumferentially extending internal flange 48. When the seat member 43 has moved into the position shown in FIGURE 6 of the drawings, the ball 40 is in seating contact with the seat 42 and a flange 49, which extends circumferentially around the outside of the seat member 43, is in abutment with a resilient seal 50. The seal 50 prevents leakage of fluid between the valve member 37 and the seat member 43.

A sealing element 51, which includes a threaded fitting 52 around which is adhesively secured an annular resilient seal 53, is threaded onto the end of the seat member 43 opposite the seat 41. The resilient seal 53 is tapered and corresponds to a tapered seat 54 which forms a part of the cooling panel 25. When the cooling panel 25 is in the position shown in FIGURE 5 of the drawings, a spring 55 which abuts the flange 48 and the fitting 52 acts to urge the sealing element 51 into sealing and abutting relation with the seat element 54, while when the cooling panel 25 is in the position shown in FIGURE 6 of the drawings, the spring 55 has acted to move the seat member 43 longitudinally within the valve member 37 and hence cause the seat 42 to contact the ball 40 to cause the arrest of the flow of the cooling medium.

The outlet means 33 furnishes a path for the outlet of the warmed cooling medium which has left the cooling panel 25. An outlet conduit 60 extends through an aperture 61 in the support member 21. A coupling nut 62 is threaded onto the threaded end of the outlet conduit 60 and abuts the support member 21 on one side thereof, while a coupling nut 63 is threaded onto the extreme end of the outlet conduit 60 and abuts the support member 21 on the other side thereof. The coupling nut 63 is provided with an internal taper 63a which forms the seat for a sealing element 64. The sealing element 64 includes a threaded fitting 65 and a resilient seal 66 which extends circumferentially around the outside thereof. A resilient seal 67 is disposed between the end of the outlet conduit 60 and an internal circumferentially extending flange 68 on the coupling nut 63. The fitting 65 is internally threaded and receives a nipple 69. The nipple 69 is threadably received by a threaded fitting 70 which is disposed at the outlet opening of the return header 27.

As threaded fasteners 71 and 72 are threaded into angle members 73 and 74, respectively, the seat 54 and the seal 53 of the inlet means 32 and the seat 63a and the seal 66 of the outlet means 33 are brought into sealing engagement, respectively. The end of the coupling nut 63 at which the taper 63a is disposed is externally threaded as indicated at 83 for purposes of placing a cap (not shown) thereon when the cooling panel 25 is removed.

When the threaded fastener 71 is tightened, the spring 55 of the inlet means 32 is compressed and the valve seat 42 will separate from the ball 40 to permit the cooling medium to enter the supply header 26. Should it be required to remove the cooling panel 25, for example, to change the lamps 23, the ballast (not shown), or for other reasons, the threaded fasteners 71 and 72 are simply removed and the interior of the inverted trough-shaped support member 21 is exposed. The fasteners 71 and 72 extend through elongated slots 75 and 75a in lugs 76 and 76a respectively. The one side of member 34 is attached at one side thereof to the support member 21. One leg 77 of the hinge 78 is attached to the support member 21 as, for example, by welding, as indicated at 79, while the other leg 80 is attached to the member 34 by welding or other suitable means. The other side of the member 34 it attached to the other side of support member 21 by means of a threaded fastener 81 which is threaded into an angle member 82. When the threaded fastener 81 is threaded out of contact with the angle member 82, the member 34 can pivot away from the cooling panel 25, which permits the removal of the latter. The member 34 is shown pivoted slightly away from cooling panel 25, in phantom, in FIGURE 5.

In FIGURE 7 of the drawings there is shown a portion of a cooling and light diffusing panel 83, which is similar in construction to the cooling panel 25 of FIGURE 3 of the drawings, having panes 84 and 85, a supply header 86 and a return header (not shown but like the return header 27 of FIGURE 3). One of the panes, in particular, pane 85, has a plurality of louver elements 87 formed integral therewith and depending outwardly therefrom. Lower elements can be constructed to depend outwardly from pane 84, if desired. The louver elements 87 extend perpendicularly to each other in a grid-like arrangement and in addition to diffusing the light and assisting the cooling of the enclosure, the louver elements strengthen the remainder of the panel 83.

Referring to the embodiment of FIGURES 8 through 11, there is shown an energy transfer panel 120 which is mounted in a wall 121 of the enclosure. The panel 120 is adapted to be used either to absorb solar radiation before it enters the enclosure or to heat the enclosure depending upon whether the heat energy transfer medium is a cooling medium or a heating medium. For the sake of clarity, the panel 120 will be described as being employed to absorb solar radiation, and hence to cool the enclosure. The panel 120 includes a supply header 122 and a return header 123, and a pair of panes 124 and 125 which are disposed in vis-a-vis relationship with respect to each other into which the supply header 122 and the return header 123 open. The ends of the cooling panel are closed, as indicated at 126 and 127. The panes 124 and 125 are preferably so spaced that a streamline flow of the cooling medium from the supply header 122 to the return header 123 results. Because of the streamline flow the panes which are preferably made transparent in this embodiment of the invention permit one to see through them without noticing the presence of the cooling medium therebetween. Although the cooling medium is a transparent medium, such as water, it can bear coloring material to reduce the quantity of light transmitted into the enclosure, if desired. The cooling medium enters the supply header 122 through inlet means generally indicated at 128, while the warmed cooling medium leaves the return header 123 through outlet means generally indicated at 129.

The panel 120 is suitably mounted in an opening in the wall 121 of the enclosure, as best shown in FIGURE 10. A pair of opposed lintels 130 and 131 span the upper and lower sides of the opening. Spaced upper suport members 132 and 133 are attached to the ceiling (not shown) while spaced lower support members 134 and 135 are attached to the floor (not shown) and are employed to maintain the panel 120 in position. The support members 133 and 135 are plastered as indicated at 136. Member 137 fits between and abuts the spaced lower support members 134 and 135. A resilient material 139 is disposed between the supply header 122 and a horizontally extending backing member 140 and the lower portion of support member 132. The backing member 140 is secured to the member 137 by a screw 141. A resilient material 142 is disposed between the return header 123 and a horizontally extending backing member 143 and the upper portion of the support member 134.

The supply header 122 is provided with a threaded fitting 144 into which the threaded end of a conduit 145 is adapted to be threaded. The conduit 145 passes through an aperture 137a in the member 137. The fitting 144 has upper and lower annular flanges 146 and 147, respectively between which the material which comprises the panel 120 is sealably straddled. A resilient washer 148 is disposed between the fitting 144 and a nut 149. When the nut 149 is tightened, the washer 148 functions to seal the connection between the fitting 144 and the conduit 145. Since the cooling medium leaves the return header 123 by outlet means 129 identical to those shown in FIGURE 11 and above described, the same reference characters are applied thereto and need not be described. A resilient material 150 is diposed between a portion of the supply header 122 and a moulding 151. With the moulding 151 secured in place by a fastener 152, the upper header 122 is resiliently supported and is out of sight. A resilient material 153 is disposed between a portion of the return header 123 and a moulding 154. With the moulding 154 secured in place by a fastener 155, the lower header 123 is resiliently supported and is out of sight.

In order to assist the wetting of all the inside surfaces of each of the panes of panels 25, 83 and 120, respectively, and hence to assist the streamline flow of the heat transfer medium, a wetting agent, which is not corrosive to metal, glass or plastic, is mixed with the heat transfer medium. No specific wetting agent need be employed to assist wetting, but alkyl aryl sulphonates or higher fatty amine salts are satisfactory.

The spacing of the panes for streamline flow is preferably determined experimentally. By way of example, only, and in no sense to limit the scope of the invention, a panel where the distance between the spaced panes is one-fourth to one-half of an inch has an inside width measured perpendicularly to the flow of the heat transfer medium of from one to three feet.

The above-described embodiments being exemplary only, it will be understood that the present invention comprehends organization differing in form or detail from the presently described embodiments. Accordingly, the invention is not to be considered as limited, save as is consonant with the scope of the following claims.

What is claimed is:

1. A light transmitting, heat transferring panel for disposition between a source of illumination and an object to be illuminated, said panel comprising:
    a pair of spaced opposed light transmitting panes defining a channel therebetween;
    said channel having a pair of opposite ends and a pair of opposite sides;
    means closing each of said opposite sides;
    each of said opposite ends being open along substantially the entirety thereof to provide a pair of opposed elongated end openings;
    an elongated supply header, extending lengthwise alongside one of said end openings and communicating with the one end opening along the entire area of the latter;
    an elongated return header extending lengthwise alongside the other of said end openings and communicating with the other end opening along the entire area of the latter;
    opening means in said supply header for introducing a light transmitting, heat transferring medium into the supply header;
    opening means in the return header for withdrawing said medium from the return header;
    louvers extending integrally outwardly from said panel in a first direction; and,
    each of said headers extending integrally from said panel in a second direction opposite said first direction.

2. In combination:
    a light bulb;
    a light transmitting, heat transferring panel;
    means mounting said panel between said bulb and an object to be illuminated, said panel comprising:
    a pair of spaced opposed light transmitting panes defining a channel therebetween;
    said channel having a pair of opposite ends and a pair of opposite sides;
    means closing each of said opposite sides;
    each of said opposite ends being open along substantially the entirety thereof to provide a pair of opposed elongated end openings;
    an elongated supply header, extending lengthwise alongside one of said end openings and communicating with the one end opening along the entire area of the latter;

an elongated return header extending lengthwise alongside the other of said end openings and communicating with the other end opening along the entire area of the latter;

opening means in said supply header for introducing a light transmitting, heat transferring medium into the supply header;

opening means in the return header for withdrawing said medium from the return header;

fluid inlet means removably connected to said opening means on the supply header;

fluid outlet means removably connected to said opening means on the return header; and, valve means, in said fluid inlet means, actuable to close the latter, in response to removal of said opening means on the supply header from its connection with said fluid inlet means.

References Cited by the Examiner

UNITED STATES PATENTS

| | | | |
|---|---|---|---|
| 1,647,943 | 11/1927 | Updegrave et al. | 20—40.5 |
| 1,843,828 | 3/1932 | McNaught | 20—40.5 |
| 2,223,470 | 12/1940 | Van Alphen | 240—11.4 |
| 2,295,046 | 9/1942 | Noel | 240—11.4 |
| 2,474,712 | 6/1949 | Aparicio | 88—107 X |
| 2,763,570 | 9/1956 | Shepard et al. | 165—133 X |
| 2,887,564 | 5/1959 | Baran | 240—9 |
| 2,904,672 | 9/1959 | Fischer | 240—46.15 |
| 2,930,594 | 3/1960 | MacCracken | 257—12 X |
| 2,986,982 | 6/1961 | Kaprelian | 95—53 |
| 3,025,685 | 3/1962 | Whitlow | 165—133 X |

NORTON ANSHER, *Primary Examiner.*